United States Patent [19]

Sandling

[11] Patent Number: 4,617,957
[45] Date of Patent: Oct. 21, 1986

[54] ROTARY PLUG VALVE

[75] Inventor: Michael J. Sandling, Barnstaple, England

[73] Assignee: Xomox Corporation, Cincinnati, Ohio

[21] Appl. No.: 516,977

[22] Filed: Jul. 25, 1983

[51] Int. Cl.$^4$ .............................. F16K 43/00; F16K 29/00
[52] U.S. Cl. ......................................... 137/315; 137/375; 137/454.6; 251/171; 251/188; 251/214; 251/309; 251/312; 251/317; 277/110; 277/117; 277/124
[58] Field of Search .................. 137/315, 454.2, 375, 137/454.6; 251/214, 309, 310, 311, 312, 159, 160, 161, 164, 188, 316, 317, 171; 277/110, 180, 117, 120, 122

[56] References Cited

U.S. PATENT DOCUMENTS

| | | | |
|---|---|---|---|
| 1,734,074 | 11/1929 | Carner | 137/312 |
| 1,946,745 | 2/1934 | Johnston | 251/171 |
| 2,744,720 | 5/1956 | Wilms | 251/161 |
| 2,954,961 | 10/1960 | Stogner et al. | 251/312 |
| 2,987,295 | 6/1961 | Schenck | 251/312 |
| 3,013,830 | 12/1961 | Milligan | 277/124 |
| 3,014,690 | 12/1961 | Boteler | 251/171 |
| 3,128,987 | 4/1964 | O'Connor | 251/312 |
| 3,133,722 | 5/1964 | McGuire et al. | 251/317 |
| 3,173,648 | 3/1965 | McGuire et al. | 251/188 |
| 3,206,163 | 9/1965 | Freed | 251/309 |
| 3,298,396 | 1/1967 | Gressman et al. | 251/310 |
| 3,330,269 | 7/1967 | Temple | 137/454.2 |
| 3,434,691 | 3/1969 | Hamilton | 251/368 |
| 3,467,394 | 9/1969 | Bryant | 277/124 |
| 3,559,950 | 2/1971 | Nelson | 251/214 |
| 3,612,478 | 10/1971 | Blazek | 251/171 |
| 3,703,184 | 11/1972 | Messerschmidt | 251/214 |
| 3,974,869 | 8/1976 | Abe et al. | 137/375 |
| 3,981,482 | 9/1976 | Callahan et al. | 251/152 |
| 4,177,998 | 12/1979 | Laitkep et al. | 277/124 |
| 4,283,062 | 8/1981 | Catanzaro et al. | 277/124 |

FOREIGN PATENT DOCUMENTS

| | | | |
|---|---|---|---|
| 21905 | 6/1882 | Fed. Rep. of Germany . | |
| 1384864 | 11/1963 | France . | |
| 1427918 | 12/1964 | France . | |
| 726178 | 3/1955 | United Kingdom | 277/124 |
| 0032037 | 7/1981 | United Kingdom | 251/317 |
| 0032038 | 7/1981 | United Kingdom | 251/317 |

Primary Examiner—George L. Walton
Attorney, Agent, or Firm—Kinney and Schenk

[57] ABSTRACT

A rotary plug valve has a frusto-conical valve plug (4) received within a frusto-conical valve chamber with a tapered valve liner (3) being provided between the two. The chamber and the plug are oppositely tapered so that by axial movement of the plug the valve liner can be wedged into tight sealing engagement with the external surface of the valve plug and the internal surface of the valve chamber. The liner and the valve plug are insertable and removable as a unit from the frusto-conical chamber.

13 Claims, 6 Drawing Figures

4,617,957

ROTARY PLUG VALVE

DESCRIPTION

This invention relates to an improved rotary plug valve and more especially to a plug valve having a plug rotatable within a chamber in the valve housing, a liner comprising resilient plastics material being provided between the plug and the internal wall of the chamber for sealing purposes.

In such valves the plastics material acts as a sleeve to provide a seal between the metal body of the valve and the metal plug which operates the opening and closing function. In the Applicants earlier pending Europen patent application No. 80304651.5 published under number 0032038, there is disclosed a rotary plug valve in which a valve plug is rotatable within a valve liner which itself is received with a frusto-conical chamber in the valve so that for replacement purposes the plug and liner can be removed as a unit from the frusto-conical valve chamber. While generally these valve constructions are providing very successful we have now found that for some purposes, particularly for smaller size valves, it is advantageous for the valve plug to have a conicity in the opposite sense to the valve chamber with the valve linear consequently increasing in thickness from one end of the chamber to the other. With this construction the sealing action of the valve can be accurately controlled simply by drawing the valve plug towards the wider end of the frusto-conical chamber to compress the liner. When it is desired to change the valve plug and liner, tight binding of the liner on the wall of the chamber can readily be released simply by moving the valve plug axially to a small extent before drawing the valve plug and liner as a unit from the chamber.

According to the present invention there is provided a rotary plug valve comprising a housing having a body with inlet and outlet ports for the inlet and outlet fluid and a frusto-conical chamber into which the ports open, a liner within the chamber having apertures therethrough aligned with the ports and a frusto-conical plug having a flow passage therethrough received within the liner, said plug being sealed by the liner for rotation from exteriorly of the housing between valve-open and valve-closed positions in which, respectively, the passage provides communication between the apertures aligned with the ports and the plug blocks such communication, said frusto-conical plug having a taper in the direction opposite to the taper of the chamber and means being provided for moving the plug axially relative to the body to control the degree of compression of the liner between the tapered side walls of the plug and the chamber.

Preferably the housing includes a removable cover portion having an aperture therethrough in which is received an extension portion of the plug with this cover portion having the linear secured thereto. Preferably the cover portion has the linear comprised of resiliently compressible material moulded thereto and the cover portion may itself be formed as the cage to which the compressible material is moulded as disclosed in the specification of our above mentioned European patent application.

Preferably the means moving the plug axially comprises a nut fitted to one of the plug and the housing and again supported directly or indirectly with a shoulder on the other of the plug and the housing.

In the particularly preferred construction as later illustrated the means for moving the plug axially comprises a nut threaded to the plug and engageable via a thrust ring received in an annular space between the plug extension portion and the cover portion with an abutment on the housing cover portion. A spacer ring may be provided in the annular space to have a shoulder engaging said abutment, said thrust ring being received between one end of said nut and one end of said spacer ring. The other end of the spacer ring may serve as an abutment for compression of a gland ring received in an area of space defined by the liner, the extension portion of the plug and the other end of the spacer ring.

It will be appreciated that while the valve would normally be constructed with the inlet and outlet apertures aligned with the passage in the valve open position, the passage thus providing a straight path for the flow of fluid through the valve where open, in an alternative construction there may only be one aperture through a frusto-conical wall of the chamber with the other aperture being provided through a bottom wall of the chamber, the passage in the plug being bent through 90° to provide the necessary connections.

The invention will now be further described, by way of example, with reference to the accompanying drawings, in which.

Figure 1:
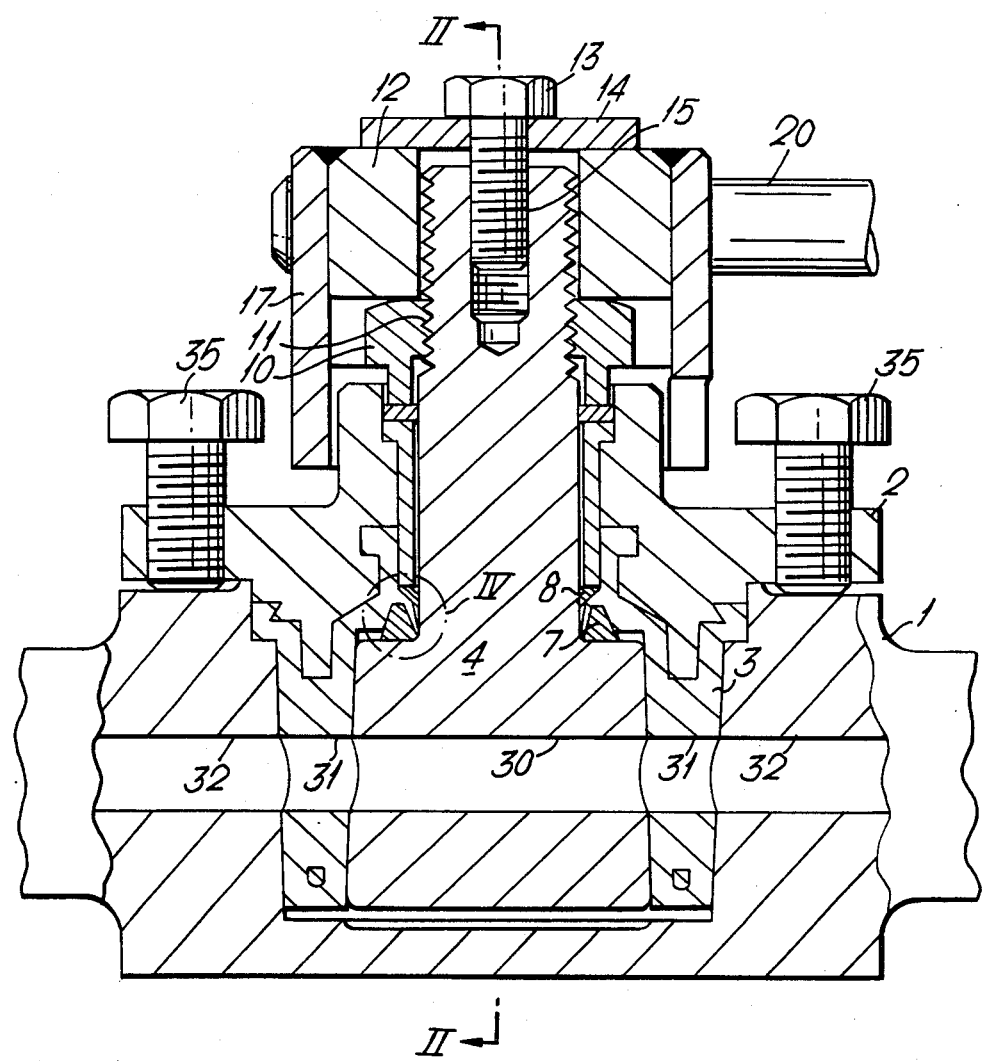
FIG. 1 is a longitudinal sectional view of a fluid flow control valve embodying the present invention, the valve being shown in its open position with the section being taken along the line I—I of FIG. 2.

Illustrated in the drawings is a fluid flow control valve comprising a valve housing having a body portion 1 and a cover portion 2. Defined within the valve housing is a frusto-conical chamber which has its wider open end closely by the cover portion 2. Within the chamber is located a valve liner 3 made of resilient plastics material and received within the liner 3 is a valve plug 4. The valve plug 4 is rotatable between a closed position and an open position shown in FIG. 1, where a through passageway 30 in the valve plug is lined with inlet and outlet apertures 31 in the valve liner and inlet and outlet ports 32 in the valve body. The main portion of the valve plug 4 received within the liner 31 has a frusto-conical shape with the direction of taper being opposite to that of the frusto-conical chamber in the valve body so that the liner 3 increases in thickness from the closed end of the chamber to the open end closed by the cover 2.

Figure 3:
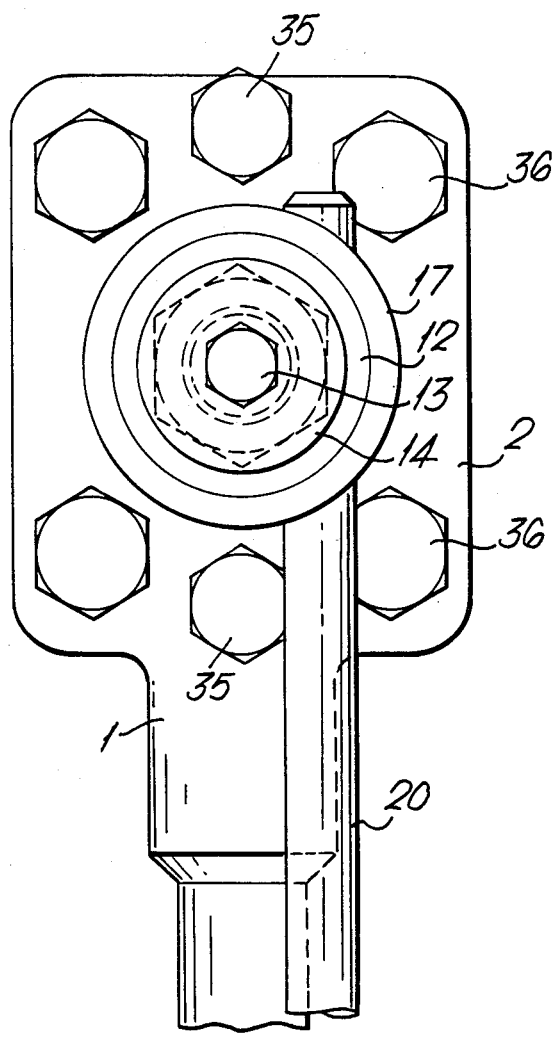
FIG. 3 is a top plan view to a reduced scale of the valve of FIG. 1.

The cover portion 2 is secured to the main portion of the valve body by bolts 36 (FIG. 3). Keyed to an upper extension portion of the valve plug 4 is an actuating member 12 secured in position on the extension portion of the valve plug by means of a washer 14 and a bolt 13 screw-threadedly received in a bore in the top of the extension portion. A header ring 17 is secured about the actuating member 12 to provide a skirt, part of which is cut out at 22 so as to receive a stop 23 secured to the housing cover portion, the ends of the cutout 22 acting as stops to limit rotation of the ring 17, and thus of the actuating member 12, to 90° of rotation between its valve open and valve closed positions. A handle 20 is received within a bore in the actuating member 12 and secured therein by a socket-headed grub screw 21. A seal control nut 10 is threaded at 11 to the extension portion of the plug 4 and has a skirt projecting into an annular space between the extension portion of the plug and the cover portion 2 to engage a thrust ring 9 which itself engages the top of a spacer ring 6, the spacer ring 6 being provided with a shoulder engaging a shoulder 16 on the cover portion 2 and its lower end engaging a gland seal ring 8. A delta seal ring 7 is provided in a recess in the liner 3 to engage the top of the main frusto-conical portion of the valve plug 4 as will be described later in greater detail in connection with FIG. 4.

Figure 6:
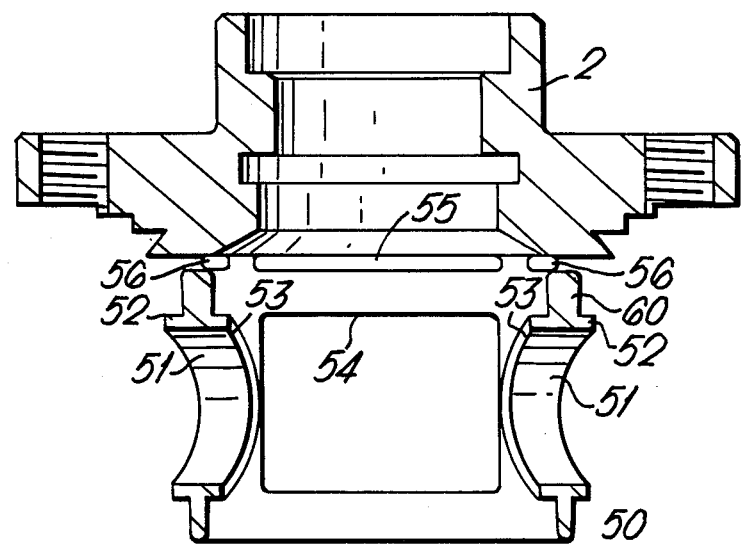
FIG. 6 is a horizontal section view of a preferred construction of a valve cover portion formed integrally with a linear supporting cage.

Preferably the housing cover 2 has the plastics material of the liner 3 moulded directly thereto so as to be securely fastened thereto as illustrated in the drawings. The cover portion 2 is provided with a cage having a lower annular portion 5 connected by spaced vertical portions, now shown, with the upper part of the cover portion in order that the liner may function with the plastics material being moulded to the cover portion as described in our above-mentioned European patent application. However in some cases where the sealing requirements of the valve are not too stringent it may simply be necessary to have a single ring 5 at the bottom of the liner without this ring being connected to the main upper part of the cover portion of the housing or, indeed, in some circumstances it may be possible to dispense with the ring 5 in its entirety. In these latter two cases instead of the plastics material being moulded directly to the cover housing it may be so formed as simply to be resiliently retained by being sprung into recesses in the cover portion. However the preferred construction is as shown in FIG. 6 as will be explained later.

During assembly of the valve the valve plug 4, together with the sealing and spacing rings, is assembled as a unit with the cover portion 2 by the nut 10 being loosely screwed to the end of the extension portion of the valve plug. The valve plug and liner are then inserted as a unit into the frusto-conical chamber within the valve body 1 and the cover 2 is securely bolted into position by means of bolts 36. Jacking bolts 35 are threaded in bores through a flange around the cover portion 2 for a purpose to be disclosed later, at this time these bolts being left sufficiently loose to permit proper tightening down of the cover portion 2 by means of the bolts 36.

Once the cover portion 2 has been secured in position the nut 10 is tightened down to engage the thrust ring 9 so as to abut, via the thrust ring 9 and the shoulder on the spacer ring 6, with the abutment shoulder 16 on the cover portion 2. This causes the valve plug 4 to be drawn upwardly away from the closed end of the valve chamber and, because of the reverse taper, to compress the valve liner between itself and the frusto-conical inner surface of the valve chamber so as to provide a seal around the ports 32 and aperture 31. Simultaneously with compression of the valve lining the delta sealing ring 7 is compressed between the liner and the top of the frusto-conical portion of the valve plug to seal at that location with the gland 8 being compressed also between the thus deformed liner and the bottom end of the spacer ring 8 to provide a gland sealing action around the extension portion of the valve plug 4. Also the thrust ring 9 is clamped by the abutment thereagainst of the lower end of the skirt nut 10 to cause an additional sealing action, the gland acting directly between the housing cover portion 2 and the extension portion of the valve plug 4.

Figure 4:
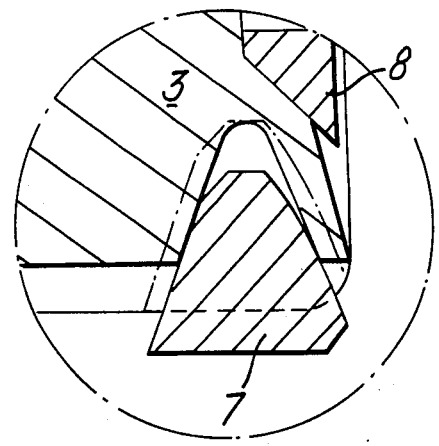
FIG. 4 shows a detail of the seal indicated by circle-IV of FIG. 1.

The action of the delta ring 7 and gland seal 8 can be appreciated from the showing of FIG. 4 where the seals and the liner are shown in their relaxed condition by solid lines. Upon drawing up of the valve plug the delta sealing ring 7 is forced upwardly to adopt the position shown by the broken lines with consequent deformation of the valve liner 3 which then is cammed into tight engagement with the peripheral surface of the section portion of the valve plug with sealing ring 8 acting downwardly to ensure radial movement of valve liner 3.

Once the nut 10 has been tightened to the required degree the actuating member 12 is placed in position and tightened down by the action of the screw 13. A recess at the lower end of the actuating member 12 is shaped to receive the nut 10 so that the nut 10 is held agaist rotation by the fact that the actuating member 12 itself is so keyed to the valve plug as to be non-rotatable relative thereto.

Figure 2:
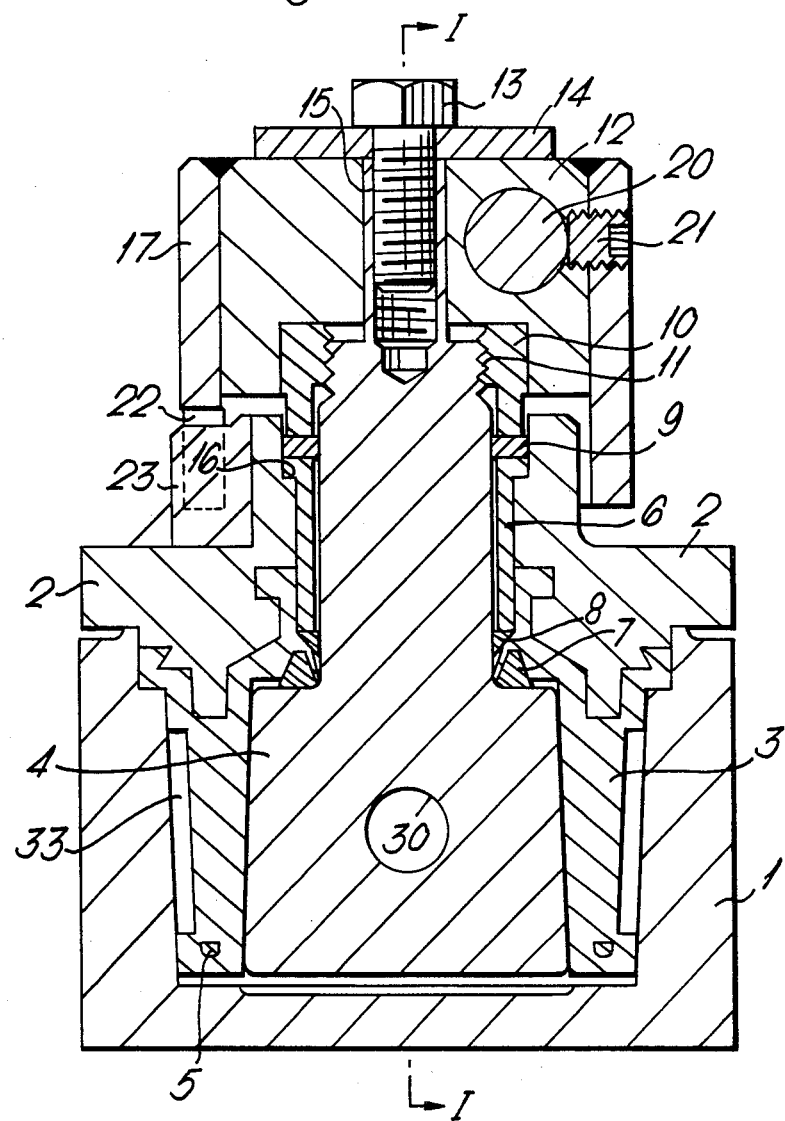
FIG. 2 is a cross sectional view taken along the line II—II of FIG. 1.

The general operation of the valve liner 3 with the supporting cage structure downwardly projecting from the housing cover portion 2 can be appreciated from the disclosure of our above-mentioned copending European patent application. It may be noted from FIG. 2 that the outer periphery of the valve liner has spaces 33 at which it is relieved so that the basic sealing action only takes place when the liner is directly supported by internal metal cage structure with forces between the valve plug and the liner being reduced opposite the relief portion 33 so as to reduce frictional resistance to rotation of the valve plug 4.

During use of the valve should leakage start occurring then it is a straighforward matter simply to remove the actuating member 12 and to tighten down the nut 10 to increase the sealing forces.

Should it be desired to repair the valve, for example by replacing the liner and valve plug, then all that is required is simply to unscrew the nut 10 slightly to relieve the wedging forces biasing the valve liner against the frusto-conical side wall of the valve chamber and then, after release of the screws 36, to screw down the jacking screws 35 to force the valve cover 2 upwardly away from the valve body 1 and thus to draw the complete unit of valve liner and valve plug out from the tapered valve chamber.

Figure 5:
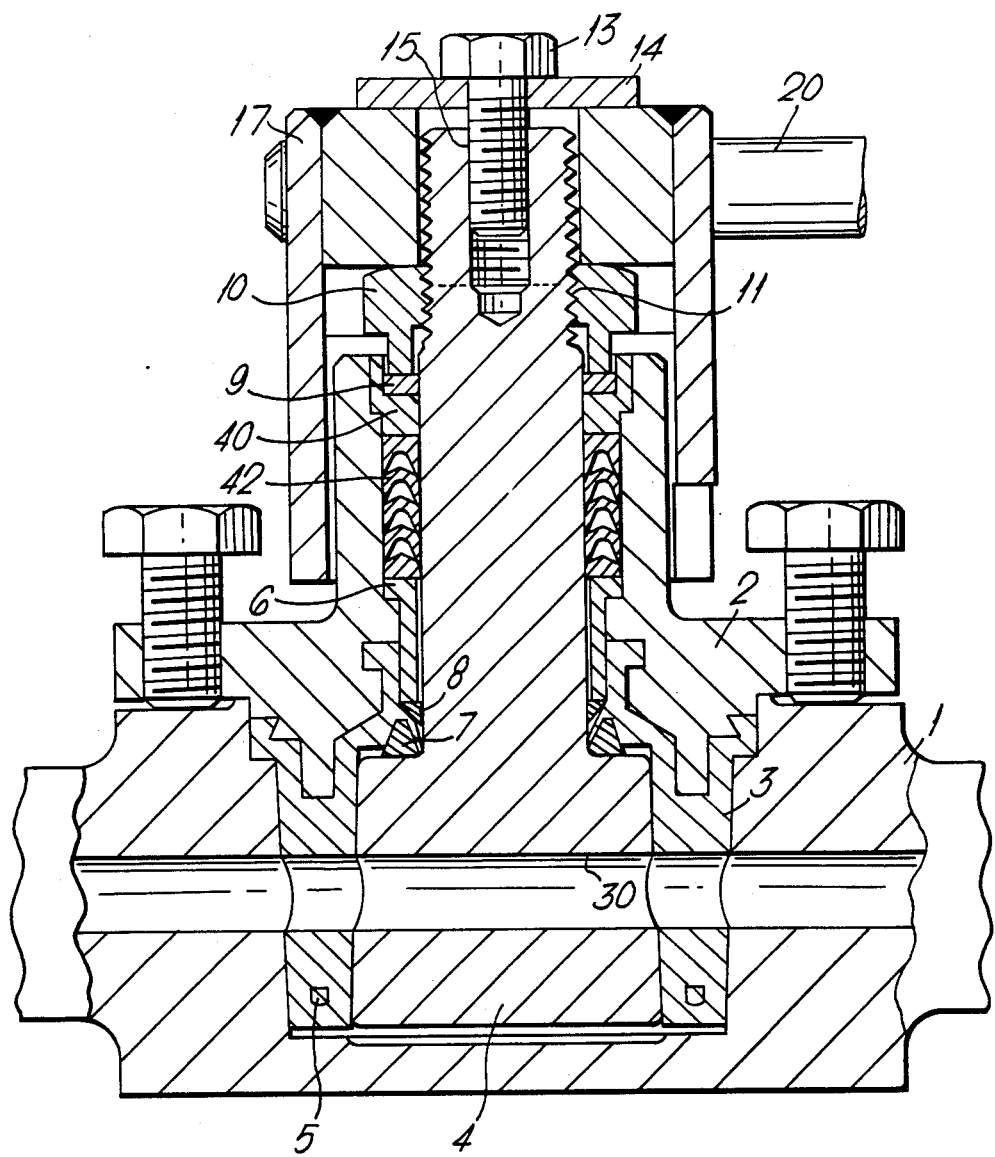
FIG. 5 is an illustration similar to FIG. 1 but showing an alternative, modified, construction.

FIG. 5 shows a construction generally similar to that of FIG. 1 with the exception that instead of the thrust ring 9 being sandwiched directly between the nut 10 and the spacer ring 6 it is sandwiched between the nut 10 and a pressure set ring 40 with a series of seal rings 42 being provided between the pressure set ring 40 and the top of the spacer ring 6. This construction works generally as before with the exception that the spacer ring 6 can float upwardly slightly to cause the cup seal rings 42 to be forced into tight sealing engagement with the peripheral surfaces defining the annular space in which they are received.

As previously mentioned the particular valve constructions as disclosed are intended for use with smaller sized valves, for example with passage diameters of about 2 cms.

FIG. 6 shows a preferred construction of the cover portion 2 formed integrally with a cage about which the liner will be moulded prior to insertion in the valve housing. As shown the top portion 2 has on its lower side a cage which comprises a bottom ring portion 50 and an upper ring portion 60. Aligned circular apertures 51 are provided through opposite sides of the peripheral wall of the cage and are surrounded by outer and inner flanges 52 and 53 respectively. The peripheral wall of the cage is also provided with a pair of opposite cut-out portions 54 and additional cut-out apertures 55 and 56 are provided between the upper ring portion 60 and the main body of the lid portion 2. The liner, when it is moulded to the lid portion 2, has apertures therethrough centrally of the apertures 51 for the passage of fluid and the valve in its open position with the passage through the valve plug aligned with the passage 51. Moulded liner material penetrates the apertures 54, 55 and 56 in order that the liner may be securely fixed to the cage. The flange portions 52 and 53 ensure that the liner is well supported for a good sealing action between the plug and the valve housing around the fluid inlet and outlet ports. The cut-out portions 54 facilitate the provision of the space 33, shown in FIG. 2, whereby the force between the rotary plug and the liner is relieved at these portions to facilitate rotation of the valve plug.

I claim:

1. In a rotary plug valve comprising a housing having a body provided with an inlet port and an outlet port respectively for the inlet and outlet of fluid and defining therein a frusto-conical chamber having a wide open end and a narrow closed end interconnected by a tapered side wall through which said ports communicate; a liner formed of a compressible material and being disposed within the chamber, said liner having a frusto-conical outside surface disposed against said tapered side wall of said chamber and having a frusto-conical inside surface, said liner having apertures therethrough aligned with said ports; a frustoconical plug received with said liner, said plug having a flow passage therethrough and having a frusto-conical outside surface disposed in sealing relation against said frusto-conical inside surface; and means for rotating said plug from exteriorly of said housing between a valve-open position and a valve-closed position in which, respectively, said passage provides communication between said apertures aligned with said ports and said plug blocks said communication; the important wherein said frusto-conical outside surface of said plug is tapered in a direction opposite to the direction of taper of said tapered side wall of said chamber, said frusto-conical outside surface of said plug and said frusto-conical inside surface of said liner are tapered toward said wide open end, and means is provided for moving said plug axially relative to said body to control the degree of compression of said liner between said plug and said tapered side wall of the chamber, said moving means operating to increase said degree of compression of said liner between said frusto-conical outside surface of said plug and said tapered side wall of said chamber upon moving said plug toward said open end.

2. A rotary plug valve according to claim 1, wherein said housing includes a removable cover portion having an opening therethrough, and said plug has an extension portion extending through said opening as said means for rotating the plug.

3. A rotary plug valve according to claim 2 wherein said cover portion has said liner secured thereto.

4. A rotary plug valve according to claim 2, wherein said compressible material of said liner is a resiliently compressible material and is moulded to said cover portion.

5. A rotary plug valve according to claim 1, including a shoulder on said plug and a delta section seal ring provided between said shoulder on the plug and said liner.

6. A rotary plug valve according to claim 1 wherein said means for rotating the plug is operable to rotate said extension portion thereof without causing relative movement of said nut and plug.

7. A rotary plug valve according to claim 1, including connecting bolts securing said housing cover portion to said body, and jacking bolts for forcing said cover portion away from said body.

8. In a rotary plug valve comprising a housing having a body provided with an inlet port and an outlet port respectively for the inlet and outlet of fluid and defining therein a frusto-conical chamber having a tapered side wall through which said ports communicate; a liner within said chamber, said liner being formed of compressible material, said liner having apertures therethrough aligned with said ports; a frusto-conical plug sealingly received within said liner and having a flow passage therethrough; and means for rotating said plug from exteriorly of said housing between a valve-open position and a valve-closed position in which, respectively, said passage provides communication between said apertures aligned with said ports and said plug blocks said communication; the improvement wherein said frusto-conical plug has a tapered side wall which is tapered in a direction opposite to the direction of taper of said tapered side wall of said chamber, means is provided for moving said plug axially relative to said body to control the degree of compression of said liner between said tapered side wall of said plug and said tapered side wall of said chamber, said housing comprises a removable cover portion having an opening therethrough, said plug has an extension portion extending through said opening and comprises said means for rotating said plug, and said cover portion comprises a cage to which said liner is moulded, said cage having cut-out apertures therein which receive therethrough said compressible material forming said liner.

9. In a rotary plug valve comprising a housing having a body provided with an inlet port and an outlet port respectively for the inlet and outlet of fluid and defining therein a frusto-conical chamber having a tapered side wall through which said ports communicate; a liner within said chamber, said liner being formed of compressible material, said liner having apertures therethrough aligned with said ports; a frusto-conical plug sealingly received within said liner and having a flow passage therethrough; and means for rotati,ng said plug from exteriorly of said housing between a valve-open position and a valve-closed position in which, respectively, said passage provides communication between said apertures aligned with said ports and said plug blocks said communication; the improvement wherein said frusto-conical plug has a tapered side wall which is tapered in a direction opposite to the direction of taper of said tapered side wall of said chamber, means is provided for moving said plug axially relative to said body to control the degree of compression of said liner between said tapered side wall of said plug and said tapered side wall of said chamber, said housing comprises a removable cover portion having an opening therethrough, said plug has an extension portion extending through said opening and comprises said means for rotating said plug, an annular space is provided between said plug extension portion and said cover portion, an abutment is provided on said housing cover portion, a thrust ring is received within said annular space, and said means for moving said plug axially comprises a nut threaded to said plug extension and engageable via said thrust ring with said abutment, whereby upon rotation of said nut, said thrust ring is forced against said abutment drawing said plug linearly to thereby compress said liner.

10. A rotary plug valve according to claim 9, comprising a spacer ring provided in said annular space, said spacer ring having a shoulder engaging said abutment, and said thrust ring being received between said nut and said spacer ring.

11. A rotary plug valve according to claim 10, wherein an annular space is defined by said liner, said extension portion of said plug and said spacer ring and there is provided a gland ring received in said latter annular space and wherein said spacer ring has one end engaged by said thrust ring and another end serves as an abutment for compression of said gland ring.

12. A rotary plug valve according to claim 9, and further comprising a compressible seal means provided between said gland ring and a top annular surface of said plug.

13. A rotary plug valve according to claim 9, wherein said means for moving said plug axially comprises a nut and a shoulder cooperable one with the other, said nut being threaded to one of said plug and housing and said shoulder being provided on the other of said plug and said housing.

* * * * *